(12) United States Patent
Stringham

(10) Patent No.: US 6,609,172 B1
(45) Date of Patent: Aug. 19, 2003

(54) BREAKING UP A BUS TO DETERMINE THE CONNECTION TOPOLOGY AND DYNAMIC ADDRESSING

(75) Inventor: Gary G. Stringham, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/556,018

(22) Filed: Apr. 20, 2000

(51) Int. Cl.[7] .................. G06F 13/00; G06F 13/20; G06F 3/00
(52) U.S. Cl. .................. 710/305; 710/316; 710/129; 710/131; 375/211; 375/214
(58) Field of Search .................. 375/211, 214, 375/213, 215; 710/316, 107, 131, 126, 129, 5, 4, 305; 395/500, 309, 800

(56) References Cited

U.S. PATENT DOCUMENTS

| | | | | |
|---|---|---|---|---|
| 4,887,262 A | | 12/1989 | van Veldhuizen | 370/85.1 |
| 5,313,618 A | * | 5/1994 | Pawloski | 703/28 |
| 5,408,637 A | * | 4/1995 | Shimizu | 703/25 |
| 5,551,053 A | | 8/1996 | Nadolski et al. | 395/829 |
| 5,581,716 A | * | 12/1996 | Park | 710/110 |
| 5,648,984 A | * | 7/1997 | Kroninger et al. | 375/211 |
| 5,651,138 A | * | 7/1997 | Le et al. | 711/154 |
| 5,794,012 A | * | 8/1998 | Averill | 703/21 |
| 5,797,036 A | * | 8/1998 | Kikinis | 710/38 |
| 5,901,325 A | | 5/1999 | Cox | 395/821 |
| 6,374,322 B1 | * | 4/2002 | Saze et al. | 710/316 |

* cited by examiner

Primary Examiner—Jeffrey Gaffin
Assistant Examiner—Angel L Casiano
(74) Attorney, Agent, or Firm—Anthony J Baca

(57) ABSTRACT

There is disclosed a wired-AND bus emulator circuit that allows any node to prevent propagation of information through the node. A controller can command all other controllers on the bus to break the bus thereby allowing the controller to determine the topology and possibly dynamically program the address of each controller on the bus. By allowing a controller to determine the bus topology, and possibly program the address of each other controller, the bus designer can configure the bus in a topology that is physically convenient. Additionally, the installer is not required to program each node with a unique address.

1 Claim, 7 Drawing Sheets

BREAKING UP A BUS TO DETERMINE THE CONNECTION TOPOLOGY AND DYNAMIC ADDRESSING

BACKGROUND OF THE INVENTION

Controller Area Network (CAN) technology, as its name implied, is the network established among microcontrollers. Like computer networks, it has the similar transmission protocol defined by ISO/OSI (International Standard Protocol/Open System Interconnection) 7-layer model. However, unlike computer networks, it uses a simplified 7-layer model in which only 2 of the lowest stacks were defined, i.e. Data-Link Layer and Physical Layer. This simplification allows the protocol to be more "open" than computer networks, i.e. it allows the users freedom to develop their own applications. CAN offers Error Detection/Confinement ability in which the feature is burnt into the silicon during manufacturing. This significantly reduces the burden of the microcontroller in verifying the CAN signal on the bus. The failure node determines itself and retransmit the signal upon detecting the failure in transmission.

CAN was first established for automobiles in mid 1986. The first CAN chip was available in 1987 by Intel. After which, many companies adopted the CAN technology to develop higher level protocols.

CAN consists of a single bit-serial channel for all information. Transmission and reception of data, bit timing and bus arbitration all take place on what is logically a single line. The CAN Physical Layer defines the electrical levels and signaling scheme on the bus, the cable impedance and similar things. The physical layer characteristics are not part of the basic CAN specification. The bus is a single wire plus ground with every node connected to the bus such that every node receives every message. The most common implementation of the physical layer, as defined by ISO 11898, is a two-wire balanced signaling scheme. Several CAN transceiver chips are manufactured by Philips, such as the 82C250 transceiver which implements the physical layer defined by ISO 11898. The ISO 11898 prescribes that the cable impedance be nominally 120 Ohms, but an impedance in the interval of [108 132] Ohms is permitted.

The CAN bus uses Non-Return To Zero (NRZ) with bit-stuffing. There are two different signaling states: dominant and non-dominant. These correspond to certain electrical levels which depend on the physical layer used. The modules are connected to the bus in a wired-AND fashion: if one node is driving the bus to the dominant state, then the whole bus is in that state regardless of the number of nodes transmitting a non-dominate state. This requirement that if one node is driving the bus to the dominant state, then the whole bus is in that state regardless of the number of nodes transmitting a non-dominate state is fundamental to bus arbitration. In particular, bus arbitration for control of the bus takes place while the arbitration field, which is the first field transmitted, is transmitted. If a node, which is sending a non-dominate state, sees that the bus is in the dominate state, it recognizes that another node is transmitting a higher priority message and stops transmitting.

During arbitration, a node transmits its address on the bus. Each node must have a unique address for the arbitration to operate. A common method is to pre-assign addresses to a node either by encoding the address into the device or providing a means of entering an address by using, for example, DIP switches. Setting the DIP switches can be very error prone. Additionally, the bus topology can not be inferred from the addressing.

SUMMARY OF THE INVENTION

In order to accomplish the present invention there is provided a wired-and bus emulator interface circuit that has a first bus port having a first input and a first output. There is a second bus port having a second input and a second output and a controller port having a receive, transmit, a first enable and a second enable. The first output outputs a non-dominate state if the first enable is inactive. If the first enable is active, the first output outputs a dominate state if either the transmit or second output is in the dominate state. The second output outputs the non-dominate state if the second enable is inactive. If the second enable is active, the second output outputs the dominate state if either the input or transmit is in the dominate state. The receive outputs the dominate state if either the input, the transmit or the second input is in the dominate state.

There is an alternate embodiment that has a controller port having a receive, a transmit and an enable. There is also a configurable port having an input, an output and a configure. Connecting the configure to a dominate state configures the port as a bus port. Alternatively, connecting the configure to the input configures the port as a second controller port. The receive outputs the dominate state if either the input or transmit is receiving the dominate state. The output outputs the non-dominate state if the enable is inactive. If the port is configured as the bus port, then the output outputs the transmit state if the enable is active. If the port is configured as the second controller port then the output outputs the dominate state if either the input or transmit is receiving the dominate state.

There is yet another alternate embodiment of an interface circuit using a bus port having an input and an output and a controller port having a receive, a transmit and an enable. The receive outputs a dominate state if either the input or transmit is in the dominate state. The output outputs the non-dominate state if the enable is inactive; if the enable is active, the output outputs the transmit state.

BRIEF DESCRIPTION OF THE DRAWINGS

A better understanding of the invention may be had from the consideration of the following detailed description taken in conjunction with the accompanying drawings in which.

DETAILED DESCRIPTION OF THE PREFERRED EMBODIMENTS

Figure 1:
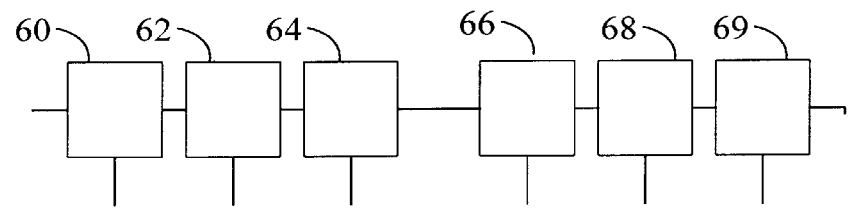
FIG. 1. shows a diagram of a bus system.
Figure 2:
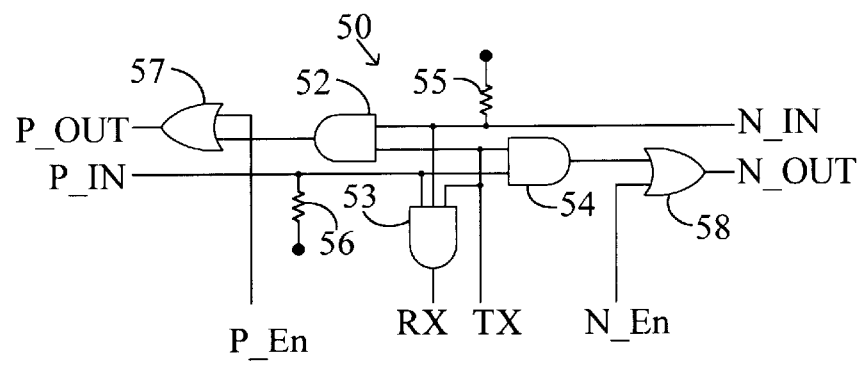
FIG. 2 shows a schematic diagram of an interface circuit in accordance with the present invention.

The present invention is not limited to a specific embodiment illustrated herein, in particular, the present invention is described using the CAN bus as an example, however the present invention emulates a wired-AND bus and therefor can be used with any wired-AND bus controller. Referring particularly to FIG. 1 and FIG. 2, which shows a diagram of a bus system. Nodes 60–69 each consists of the circuit as shown in FIG. 2. Each node is connected to a neighbor node byway of the P_OUT/P_IN or N_IN/N_OUT. Because the circuit of FIG. 2 outputs standard logic level signals, interfacing to a transceiver is relatively easy.

Each node has at least two modes of operation, herein referred to as normal and identify. In normal mode, each node 60–69 is capable of transmission as well as reception over the single-channel bus. Each node capable of transmitting bits which each fill the time interval of a bit cell, commonly referred to as Non-Returning to Zero (NRZ). The bus has a dominant signal state and a non-dominant signal state. All receivers on the bus receive the non-dominate state until a single device on that bus drives the bus to the dominate state. Once one transmitter drives the bus to a dominate state, no other device can affect the line.

In identify mode, each node is programmed to receive, but not pass the received signal. Thus, any node can hear its neighbor, but will not propagate any message between its ports. For example, node 73 in FIG. 3 can receive messages from both node 72 and node 74. Messages received by node 73 from node 74 are not passed onto node 72; similarly, messages received by node 73 from node 72 are not passed onto node 74.

Still referring to FIG. 2. There is shown a schematic diagram of an interface circuit 50 to isolate any node. Interface circuit 50 allows a device to communicate to other devices using a wired-AND bus emulation. In particular, the device connects to the RX/TX port and to the P_En/N_En lines. Subsequent interface circuits connect to either the P_OUT/P_IN or N_OUT/N_IN ports. As described above, a wired-AND bus has a dominate and a non-dominate state. The interface circuit uses a low as the dominate state and a high as the non-dominate state.

In normal mode, both P_En/N_En are a logic low. A device may place the bus in the dominate state by pulling TX to a logic low. Once TX is low, AND gate 53 receives the logic low from the TX line, causing AND gate 53 to output a logic low on RX, independent of what it is receiving on its two other inputs. AND gate 54 receives the logic low from the TX line, causing AND gate 54 to output a logic low, independent of what it is receiving on its other input, which in turn causes OR gate 58 to output a logic low on N_OUT. Similarly, AND gate 52 receives the logic low from the TX line, causing AND gate 52 to output a logic low, independent of what it is receiving on its other input, which causes OR gate 57 to output a logic low on P_OUT. If the device drives TX to a logic high, the RX, N_OUT, and P_OUT will output the non-dominate state only if N_IN and P_IN are both receiving the non dominate state. If however, either N_IN or P_IN are in the dominate state, then RX will remain in the dominate state.

Additionally, if for example P_IN is in the dominate state, AND gate 53 receives the logic low from P_IN and outputs a logic low on RX, independent of what it is receiving on its two other inputs. AND gate 54 receives the logic low from the P_IN line, causing AND gate 54 to output a logic low, independent of what it is receiving on its other input, which in turn causes OR gate 58 to output a logic low on N_OUT. In a similar manner, N_IN affects the RX and P_OUT outputs. Resister 55 and 56 insure that P_IN and N_IN respectively remain in the non-dominate state if no device is connected the port.

In identify mode, both P_En/N_En are a logic high. The logic high on P_En/N_En forces OR gates 57 and 58 to output a logic high independent of what is received on N_IN/P_IN thus preventing propagation past the present node. The RX/TX port operates as described above and therefore continues to respond to the N_IN, P_IN and TX signals.

Figure 4:
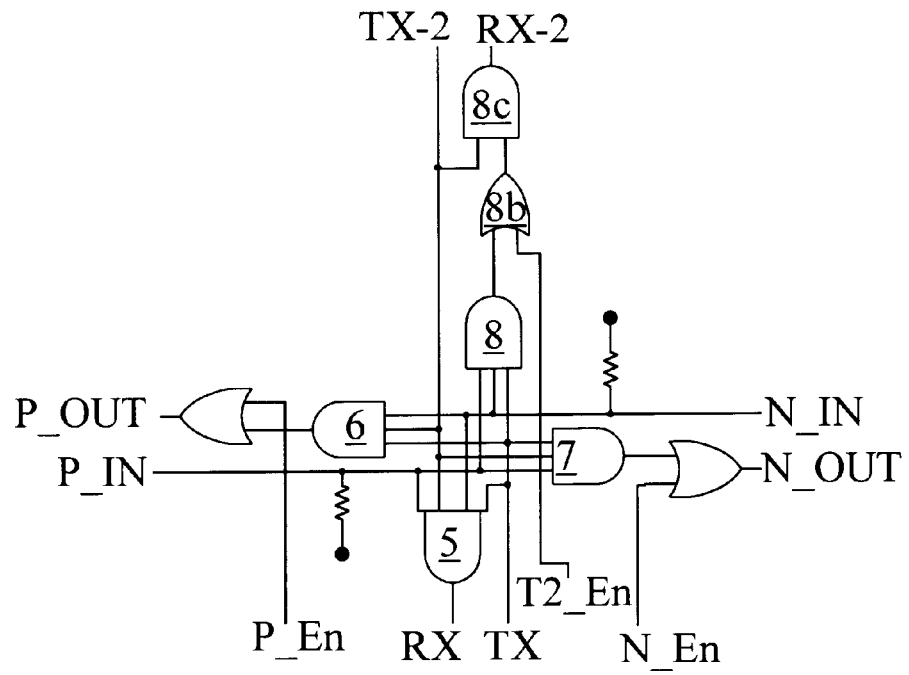
FIG. 4 shows a modification of the circuit in FIG. 2 to provide a second local port.
Figure 5:
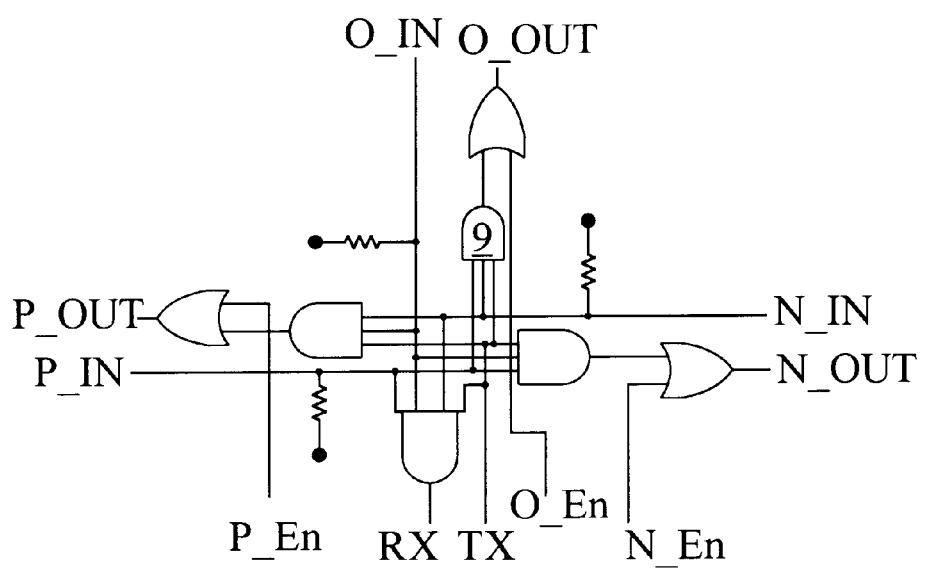
FIG. 5 shows a modification of the circuit in FIG. 2 to provide a third bus port.

FIG. 4 shows a modification of the circuit in FIG. 2 to provide a second local port. Thus, using the circuit of FIG. 4, two devices can be connected to a node in the network. A first device must connect to RX/ TX and P_En/N_En and T2_En as in the interface circuit of FIG. 2. The first device also controls the T2_En line thereby allowing it to enable or disable the second port. A second device may connect to RX-2/TX-2. Because TX-2 is connected to AND gate 8c, any device connected to TX-2 can hear itself regardless of the state of T2-EN, which is a requirement of CAN. The P_IN/P_OUT and N_IN/N_OUT ports connect to subsequent interface circuits. FIG. 5 shows a modification of the circuit in FIG. 2 to provide a third bus port. Using the circuit of FIG. 5 another bus can be connected into the node, thereby allowing a "star" type configuration. As with FIG. 2, a node connects to other nodes byway of the P_IN/P_OUT and N_IN/N_OUT, however, an additional node maybe connected to the O_IN/O_OUT port. This other node is enabled and disabled by the O_En line, which must be connected to the controller attached to the interface port.

Figure 3:
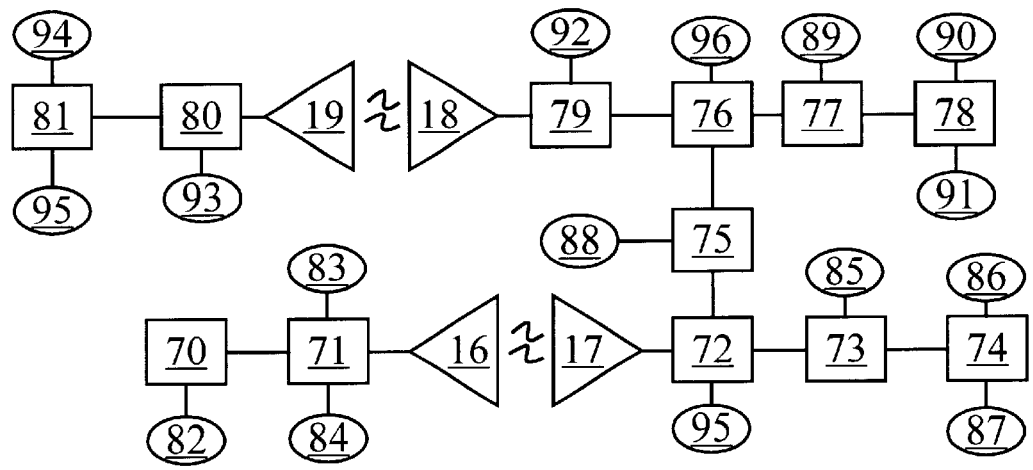
FIG. 3 shows a diagram of a bus system.

By intermixing node types of FIGS. 2, 4 and 5, a complex bus structure can be achieved. Referring to FIG. 3, there is shown an example of a bus structure using several types of nodes. Nodes 70, 73, 75, 77, 79 and 80 are all of the type shown in FIG. 2. Nodes 71, 74, 78 and 81 are all of the type shown in FIG. 4. Nodes 72 and 76 are of the type shown in FIG. 5. Items 82–95 represent devices using the bus structure. Of course, more complicated bus structures are possible.

Figure 6:
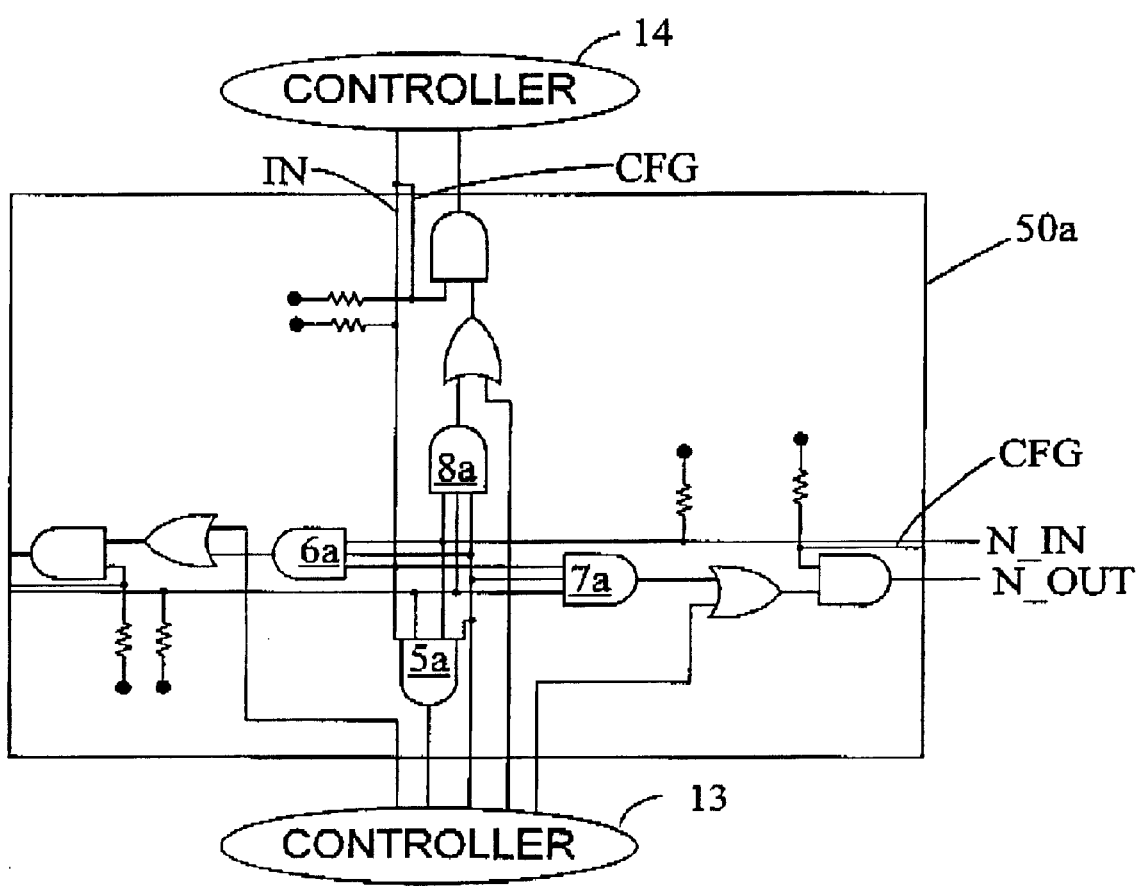
FIG. 6 shows a schematic diagram of an generic interface circuit allowing for user configuration.

As described above, the circuits of FIGS. 2, 4 and 5 allow for different number of connections and types. To simplify design of a network, the generic circuit 50a as shown on FIG. 6 can be used. Interface circuit 50a allows the network designer to purchase a quantity of a single part and then configure the part to meet the needs of the particular network. Each interface circuit must have a master controller 13 connected to the master port. Controller 13 enables or disables the remaining ports. A subsequent controller 14 may be connected to any port of the interface circuit 50a by connecting the two inputs (IN and CFG) together as shown in FIG. 6. Network port connection, such as N_OUT/N_N require that the CFG input be pulled to the non-dominate state as shown in FIG. 6. Unused ports have no connection. While FIG. 6 shows the pull-up resistor internal, these could be external to the interface circuit. With external resistors, the unconnected inputs must be keep at a the non-dominate state.

Figure 7:
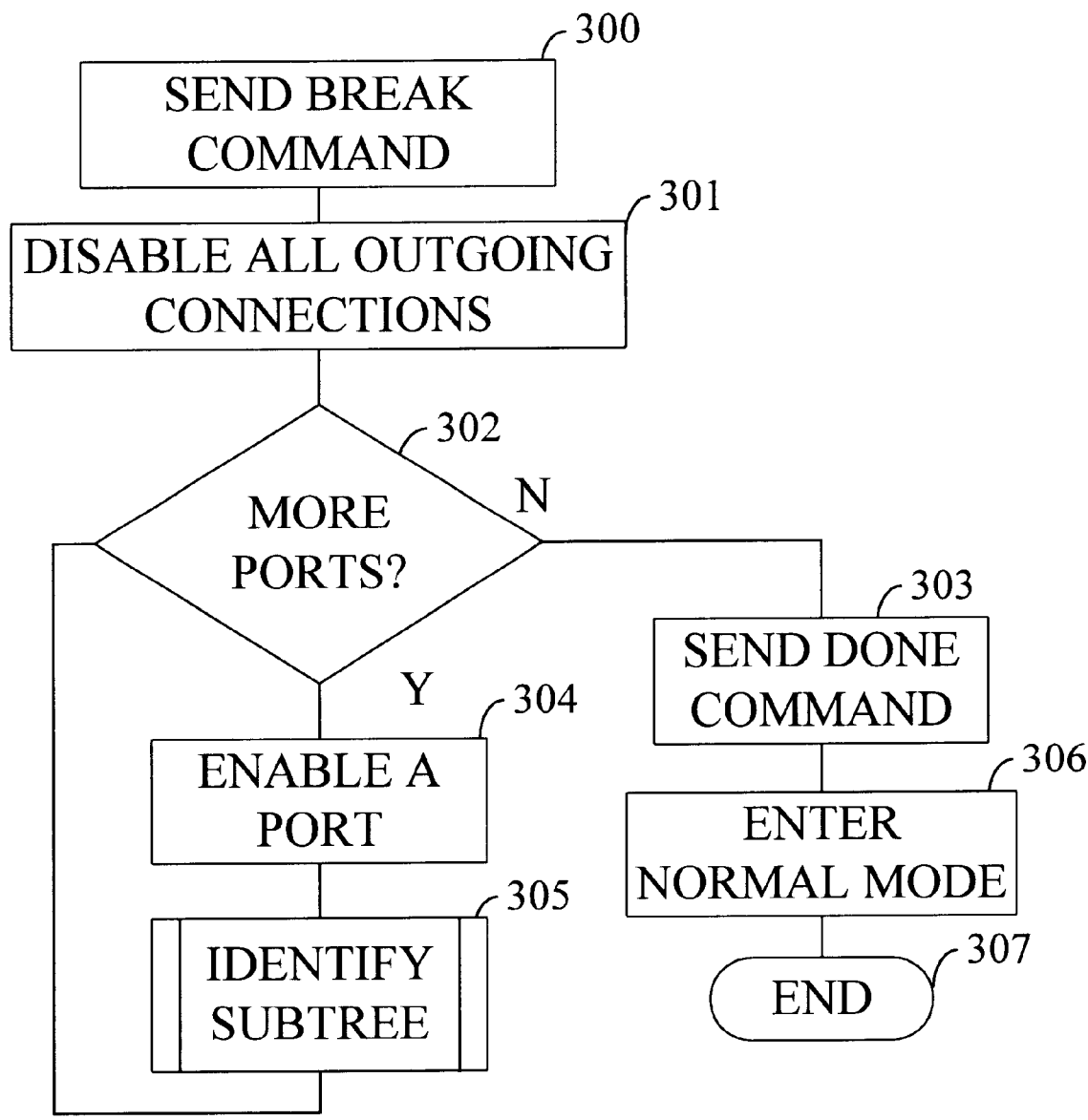
FIG. 7 shows a flowchart for transversing the bus structure.

Referring to FIGS. 7 through 11 where flow charts for transversing the bus structure are shown. Referring first to FIG. 7, any controller on the bus can initiate a bus break-up process, but once initiated, no other controller can initiate a bus break-up process until the present process is complete.

When a controller (82–95) (herein referred to as a requesting controller) wishes to determine the connection topology, it follows the logic of FIG. 7, thus it first sends a break bus command (300), which is received by all devices on the bus. The requesting controller then disables all outgoing ports (301) by de-asserting P_En, N_En, O_En and T2_En as appropriate. Incoming lines are not affected. At this point, each node 70–81 can hear only its neighbor node. The requesting controller then enables a single outgoing port (304) by asserting P_En, N_En, O_En or T2_En as appropriate and enters the Identify Subtree routine (305).

The details of the Identify Subtree routine are given below. Upon completion of the Identify Subtree routine (305), the requesting controller enables another outgoing port (304), if one exists (302). When the requesting controller has enabled all outgoing ports, it sends the DONE command to all the controllers (303) and enters the normal mode (306) indicating to the other nodes that the requesting node has finished identifying the bus topology (307). Only after a requesting node has indicated it is finished identifying the bus topology can another controller initiate a bus break command.

Figure 8:
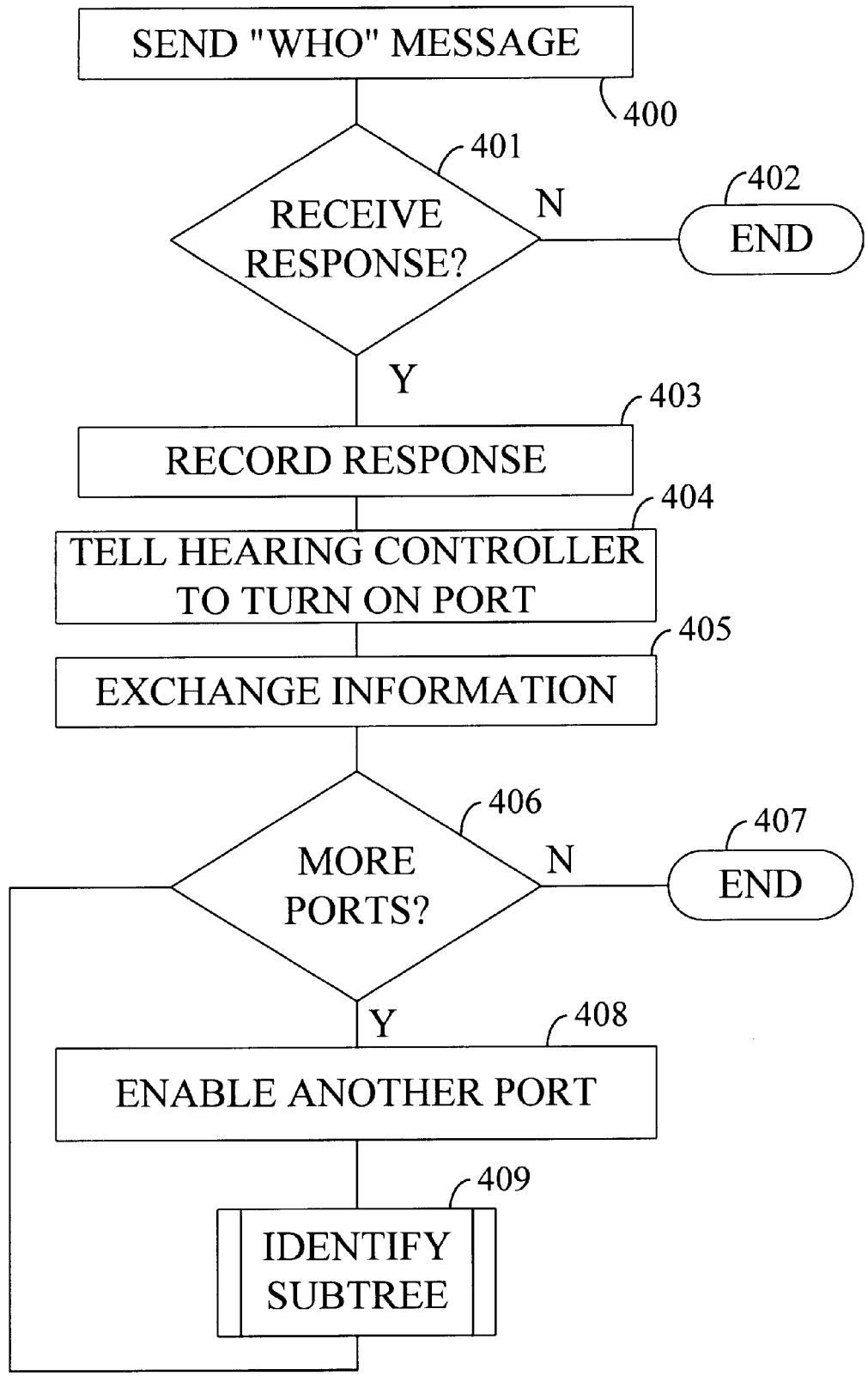
FIG. 8 shows a flowchart of the Identify Subtree subroutine.

Referring next to FIG. 8 where a flow chart of the Identify Subtree routine is shown. Upon entering the subroutine, the requesting controller sends a "WHO HEARS ME" message (400) that propagates out any enabled ports. A single unidentified controller hears this message and responds (herein referred to as a hearing controller). All previously identified controllers, hear the message, but will not respond. If the requesting controller receives a response (401), the response indicates which port the hearing node sent the reply on, for example the response might say, "I hear you on port O". The requesting controller records the response, including the heard port (403). The requesting controller commands the hearing controller to turn on the proper port (404) at which time the hearing controller and requesting controller exchange information (405).

The type of information depends on the many factors, but may include what type the controller is, what is its capabilities and function, what is its location, what is it address or how many ports can it control. The requesting controller must know the address of the hearing controller and how many ports the hearing controller can enable. In the preferred embodiment the requesting controller provides an address to the hearing controller, thereby allowing for dynamic configuration of the bus. If the address of each controller is preassigned, the address information can be sent to the requesting controller. The number of controllable ports can be received from the hearing controller as part of the information exchange (405) or a predefined maximum number of ports can be programmed into all potential requesting controllers. Other than the address information and the number of controllable ports, any of the above information may be exchanged at a later time to allow the bus identification process to complete in a timely manner.

The requesting controller then commands the hearing controller to enable another port (408), if one so exists (406) and recursively calls the Identify Subtree routine (409). The requesting controller continues to traverse the bus structure by executing the logic of FIG. 8 until all the ports of all the nodes emanating from the enabled port of the requesting controller are enabled. As describe above, the requesting controller then enables another local port (302, 304 of FIG. 7) and then traverses that branch (305).

Figure 9:
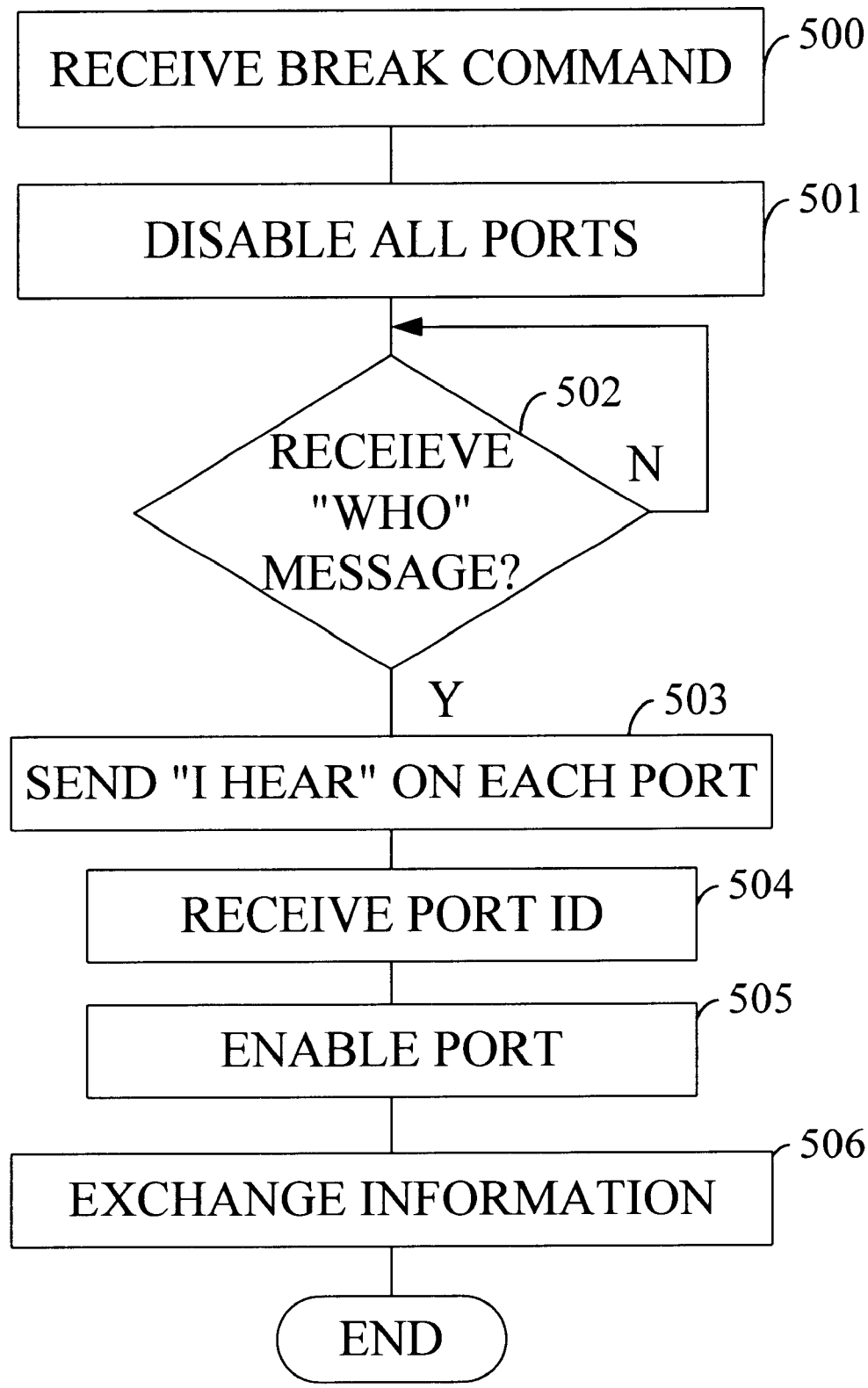
FIG. 9 shows a flowchart for transversing the bus structure.
Figure 10:
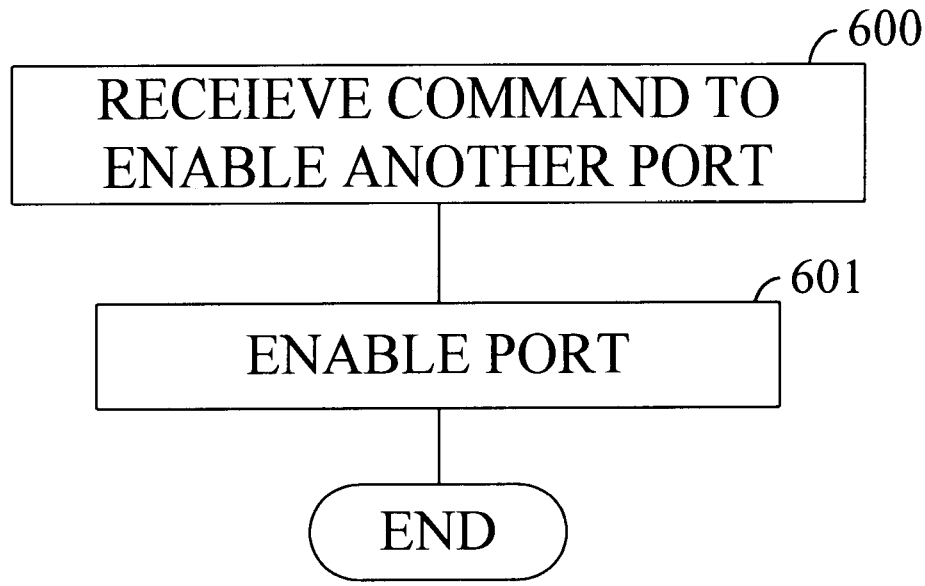
FIG. 10 shows a flowchart for transversing the bus structure.
Figure 11:
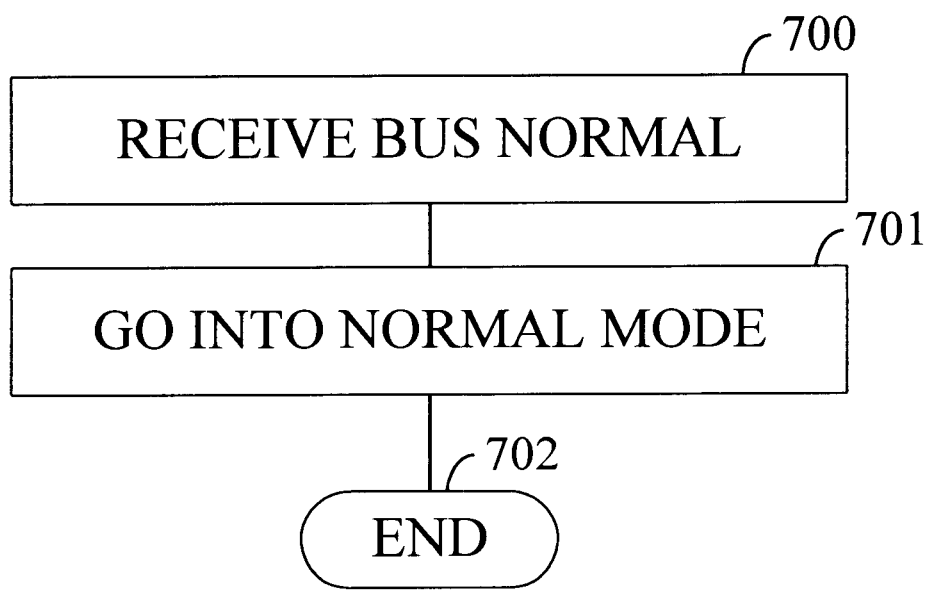
FIG. 11 shows a flowchart for transversing the bus structure.

Upon receiving a break bus command all nodes, except the requesting node, follow the logic of FIG. 9. Each node disables all outgoing ports (501) and waits for a "WHO HEARS ME" message (502). Upon receiving a "WHO HEARS ME", the hearing controller sends a response on each of its ports (503) where each response identifies which port it was sent on. The hearing controller then waits for a response from the requesting controller. Alternatively, the hearing controller could send a response on a single port and wait for a response, if none is heard the hearing controller then sends a response on a second port and waits for a response. The hearing controller repeats the process until it receives a response. The response from the requesting controller contains the port ID (504), which the hearing controller then enables (505). The hearing and requesting controllers can now exchange information (506). After the controllers exchange information the hearing controller exits FIG. 9 and no longer responds to a "WHO HEARS ME" message. However, this controller will respond to a command to enable another port (600, 601) as shown in FIG. 10. When the requesting controller has finished putting the bus back together, (303 in FIG. 7), all non-requesting controllers receive the "BUS NORMAL" command (700) and enter normal mode (701) as shown in FIG. 11. Once in normal mode, additional information may be exchanged; any node may request the bus topology from the requesting controller; and normal operation can occur.

Upon completion, all nodes have enabled all their outputs and the entire bus reconnected. The requesting controller now knows the topology of the bus structure. It is possible that instead of performing an identify process, that a controller could retrieve the information from a controller that has already completed the process.

A requesting controller can treat the bus as a tree structure using any number of tree-traversal algorithms to traverse the tree, querying each node, building up the bus topology, once such method has been shown.

By allowing a controller to determine the bus topology, and possibly program the address of each other controller, the bus designer can configure the bus in a topology that is physically convenient. The installer is not required to program each node with a unique address.

Many times the bus topology may directly reflect the flow of elements through the system. For example, a large, expandable, printing system, may have several modules, for functions such as duplexing, collating, stapling, binding and other. It is important that the system knows how media flows through the system and what add-ons are installed. Communication between modules is best accomplished by using a bus. If a wired-AND bus is used, the printer can determine the topology of the bus and thereby know what devices are present and in what order. Once the topology and order is known, the printer can infer the media flow through the printing and the add-on modules. The same approach can be used to a manufacturing process or other expandable, configurable type systems.

Although the preferred embodiment of the invention has been illustrated, and that form described, it is readily apparent to those skilled in the art that various modifications may be made therein without departing from the spirit of the invention or from the scope of the appended claims.

What is claimed is:

1. A wired-and bus emulator comprising:

a first bus port having a first input and a first output;

a second bus port having a second input and a second output;

a controller port having a receive, transmit, a first enable and a second enable;

the first output outputting a non-dominate state if the first enable is inactive, if the first enable is active, the first output outputting a dominate state if either the transmit or second input is in the dominate state;

the second output outputting the non-dominate state if the second enable is inactive, if the second enable is active, the second output outputting the dominate state if either the first input or transmit is in the dominate state; and the receive outputting the dominate state if either the first input, the transmit or the second input is in the dominate state.

* * * * *

UNITED STATES PATENT AND TRADEMARK OFFICE
CERTIFICATE OF CORRECTION

PATENT NO. : 6,609,172 B1 Page 1 of 2
DATED : August 19, 2003
INVENTOR(S) : Gary G. Stringham It is certified that error appears in the above-identified patent and that said Letters Patent is hereby corrected as shown below:

Drawings,
Sheet 1 of 7, delete entire Figure and insert therefor

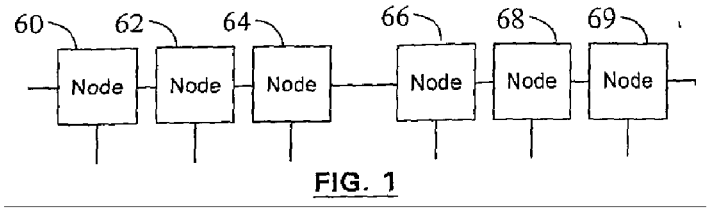

Sheet 1 of 7, delete entire Figure and insert therefor

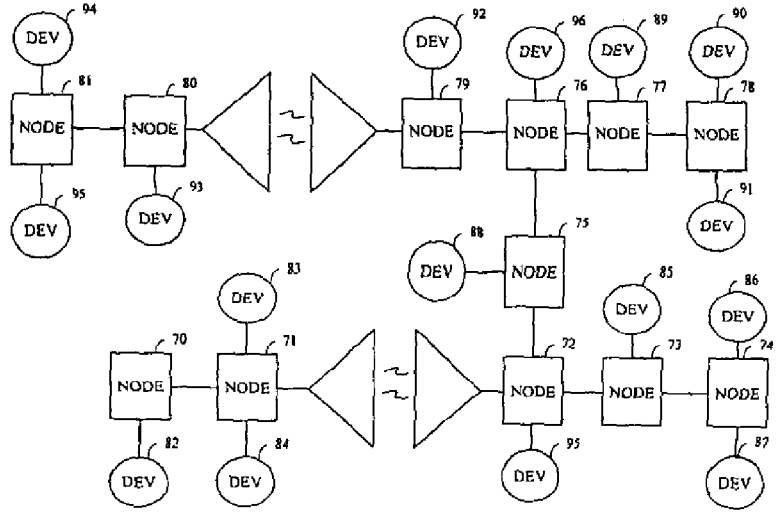

Fig. 9, Sheet 6 of 7, delete 3 occurrences of "RECEIEVE" and insert therefor
-- RECEIVE --
Fig. 10, Sheet 7 of 7, delete "RECEIEVE" and insert -- RECEIVE --

Column 1,
Line 42, delete "[108 132]" and insert therefor -- [108.. 132] --

Column 2,
Line 13, delete "retransmit" and insert therefor -- retransmits --
Line 51, delete "an" and insert therefor -- a --

UNITED STATES PATENT AND TRADEMARK OFFICE
CERTIFICATE OF CORRECTION

PATENT NO. : 6,609,172 B1
DATED : August 19, 2003
INVENTOR(S) : Gary G. Stringham It is certified that error appears in the above-identified patent and that said Letters Patent is hereby corrected as shown below:

Column 3,
Line 13, after "node" insert -- is --

Column 4,
Line 23, delete "maybe" and insert therefor -- may be --
Line 46, delete "N/_OUT/N_N" and insert therefor -- N/OUT/N_IN --
Line 51, delete "keep at a" and insert therefor -- kept at --

Column 5,
Line 25, after "on" delete "the"
Line 27, delete "it" and insert therefor -- its --
Line 49, delete "describe" and insert therefor -- described --

Signed and Sealed this

Twenty-second Day of March, 2005

JON W. DUDAS
*Director of the United States Patent and Trademark Office*